(12) United States Patent
Oda et al.

(10) Patent No.: US 8,643,252 B2
(45) Date of Patent: Feb. 4, 2014

(54) VIBRATION WAVE ACTUATOR

(75) Inventors: Yuki Oda, Yokohama (JP); Nobuyuki Kojima, Machida (JP)

(73) Assignee: Canon Kabushiki Kaisha, Tokyo (JP)

( * ) Notice: Subject to any disclaimer, the term of this patent is extended or adjusted under 35 U.S.C. 154(b) by 336 days.

(21) Appl. No.: 13/091,821

(22) Filed: Apr. 21, 2011

(65) Prior Publication Data
US 2011/0278987 A1    Nov. 17, 2011

(30) Foreign Application Priority Data

May 11, 2010 (JP) ................................. 2010-109022
Jun. 30, 2010 (JP) ................................. 2010-148513

(51) Int. Cl.
*H02N 2/04* (2006.01)

(52) U.S. Cl.
USPC ............ 310/323.16; 310/323.02; 310/323.05

(58) Field of Classification Search
USPC ............. 310/323.16, 323.17, 323.02, 323.05
See application file for complete search history.

(56) References Cited

U.S. PATENT DOCUMENTS

| | | | |
|---|---|---|---|
| 7,425,770 B2 | 9/2008 | Suzuki | |
| 7,518,286 B2 | 4/2009 | Kojima et al. | |
| 7,583,008 B2* | 9/2009 | Kojima et al. | 310/323.01 |
| 7,969,065 B2* | 6/2011 | Seki et al. | 310/323.02 |
| 2004/0161130 A1* | 8/2004 | Suzuki | 381/431 |
| 2006/0113868 A1* | 6/2006 | Sakatani et al. | 310/323.17 |
| 2006/0186760 A1* | 8/2006 | Sakano | 310/323.02 |
| 2008/0169727 A1 | 7/2008 | Yamamoto | |
| 2009/0009555 A1* | 1/2009 | Sato | 347/30 |
| 2010/0065241 A1* | 3/2010 | Ichihashi | 164/260 |
| 2011/0118404 A1* | 5/2011 | Jung et al. | 524/526 |

FOREIGN PATENT DOCUMENTS

| | | |
|---|---|---|
| JP | 2004-320846 A | 11/2004 |
| JP | 2007-189802 A | 7/2007 |
| JP | 2007-312519 A | 11/2007 |
| JP | 2009-027769 A | 2/2009 |

OTHER PUBLICATIONS

Provided english translation of JP 2007-312519, Nobuyuki.*
Elastic Properties and Young Modulus for some Materials, cited Website where examiner got references for modulus of elasticity of certain materials, Engineering Toolbox.*
Notification of the First Office Action dated May 9, 2013, in Chinese Application No. 201110116471.5.

* cited by examiner

*Primary Examiner* — Derek Rosenau
*Assistant Examiner* — Bryan Gordon
(74) *Attorney, Agent, or Firm* — Fitzpatrick, Cella, Harper & Scinto

(57) ABSTRACT

A vibration wave actuator includes a vibrator having at least an electro-mechanical energy conversion element and an elastic body to which the electro-mechanical energy conversion element is joined, with the elastic body including a contact portion formed therein, and a driven element that is in pressure contact with the contact portion of the vibrator and includes a magnetic substance. In addition, a vibrator holding portion holds the vibrator via a first elastic member having a stiffness lower than that of the vibrator, and a magnet is arranged on the vibrator holding portion such that the vibrator is placed between the driven element and the magnet.

12 Claims, 12 Drawing Sheets

MODE-C

MODE-D

MAGNETIZATION DIRECTION

VIBRATION WAVE ACTUATOR

BACKGROUND OF THE INVENTION

1. Field of the Invention

The present invention relates to a vibratory drive apparatus, such as a vibration wave actuator, and specifically relates to a vibratory drive apparatus that is favorable for use in, e.g., a mechanism that corrects blurring due to hand movements in an optical apparatus such as a camera or binoculars, or a drive mechanism for a table.

2. Description of the Related Art

Conventionally, vibration wave actuators, which are vibratory drive apparatuses that move a driven element in contact with a plurality of vibrators in a plurality of different directions (desired directions), are known. Among such vibration wave actuators, a pressure application-type vibration wave actuator in which a magnet is employed for a driven element is known (Japanese Patent Application Laid-Open No. 2009-027769). Also, Japanese Patent Application Laid-Open No. 2007-312519 proposes a vibratory drive apparatus in which a magnetic member is arranged in a space between a vibrator and a driven element. More specifically, the vibratory drive apparatus is configured so that projection portions that project from a first surface of a vibrator and are in contact with the driven element are formed, and a magnet is arranged between the first surface of the vibrator and the driven element to attract the driven element by means of a magnetic force. FIGS. 14A and 14B illustrate the configuration of a linear vibration wave actuator described in the Japanese Patent Application Laid-Open No. 2007-312519. In FIGS. 14A and 14B, a vibrator 52 is supported by a holding member 57 via an elastic supporting member 56 while preventing the hindering of vibration of the vibrator 52 by the elastic supporting member 56. Furthermore, a magnetic member 65 including a magnet is arranged on the holding member 57 and between projection portions 58 formed on an upper surface of the vibrator 52. The magnetic member 65 is held in a state in which the magnetic member 65 is not in contact with the vibrator 52 and a driven element 70, and generates a magnetic attraction force MF that attracts the vibrator 52 and the driven element 70 in a Z-direction. Pressure is applied by means of the magnetic attraction force.

Also, as another example of vibratory drive apparatuses driving a driven element by means of a vibrator, such as ultrasonic motors, there are ones using a vibrator obtained by integrating a vibration plate including, for example, an elastic metal member, and a piezoelectric element (electro-mechanical energy conversion element) by means of, e.g., adhesion. Among such vibrator-used vibratory drive apparatuses as described above, ones using magnetic force to generate pressure applied to a vibrator and a driven element have been proposed. U.S. Pat. No. 7,425,770 proposes a vibratory drive apparatus including a permanent magnet in at least a part of a vibrator. Also, U.S. Pat. No. 7,518,286 discloses a vibratory drive apparatus including a permanent magnet in at least a part of a driven element.

SUMMARY OF THE INVENTION

However, in the conventional vibratory drive apparatuses, the following problems are left unsolved.

For example, a vibration wave actuator configured to attract a vibrator with pressure using a driven element including a magnet, which is used in Japanese Patent Application Laid-Open No. 2009-027769, has the following problem. FIG. 15A illustrates results of magnetic flux density calculation using a half-sized model of a rod magnet used for a driven element that is driven to move linearly in the above-described vibration wave actuator.

FIG. 15B illustrates results of magnetic flux density calculation using a half-sized model of a magnet enlarged by extending the aforementioned magnet used for the driven element in a direction perpendicular to the linear movement direction so that the magnet can move in a plurality of directions. In the Figures, a portion with a higher concentration is illustrated with a lower magnetic flux density. Directions in which vibrators (not illustrated) are driven are indicated with arrows.

FIG. 15A indicates substantially uniform magnetic flux density distribution except an end portion of the driven element. Since the end portion in the longitudinal direction of the driven element in FIG. 15A is parallel to the drive direction, the vibrator does not pass through (pass over) the end portion of the driven element in which the magnetic flux density is low when the vibrator is driven, and thus, no problem arises. Meanwhile, in FIG. 15B, the magnetic flux density is low in a portion in the vicinity of a center of the driven element, where the vibrator frequently passes through when the vibrator is driven. Here, passage of a vibrator means motion of a vibrator and a driven element crossing each other when the vibrator is driven.

Thus, in a vibration wave actuator enabling driving in a plurality of directions in which a magnet is used for a driven element, a problem occurs in that the pressure is different depending on the positions or drive directions of the vibrators.

Furthermore, in the configuration in which a magnet is arranged between a driven element and a vibrator as in Japanese Patent Application Laid-Open No. 2007-312519, since the size of the magnet is restricted, the increase in the pressure is inevitably limited.

In view of the aforementioned problems, an object of the present invention is to provide a vibration wave actuator enabling enhancement of a pressure-contact force provided by magnetism between a vibrator and a driven element when a magnet is arranged on the vibrator side relative to a surface of contact between the vibrator and the driven element.

Furthermore, e.g., the ultrasonic motor according to the aforementioned conventional example in which pressure is applied to a vibrator and a driven element using a permanent magnet, the mechanism can be simplified compared to those in which pressure is applied using springs. However, in the conventional example configuration in which a magnetic force is used to generate such pressure, a pressure-application mechanism for bringing the vibrator and the driven element into pressure contact with each other has the following problems.

There are consistent demands for downsizing and high-density mounting of, e.g., electronic devices in which ultrasonic motors are included, and further downsizing is demanded for the pressure-application mechanisms of the ultrasonic motors as well. Meanwhile, an output of an ultrasonic motor, especially, a driving force provided by a vibrator to a driven element depends on the pressure applied to the vibrator and the driven element. In other words, the driving force provided by the vibrator to the driven element is conveyed to the driven element via a frictional force generated by the pressure contact with the vibrator, whereby the driven element is moved relative to the vibrator.

Accordingly, the driving force of an ultrasonic motor depends on the pressure that generates a frictional force by means of pressure contact. For the reasons described above, while downsizing and a pressure-application mechanism enabling provision of required pressure are demanded; since in general downsizing leads to a decrease in pressure, the aforementioned conventional configuration has room for further improvement. Furthermore, where magnetic force is used for generation of pressure, imbalance of the pressure may occur.

A magnetic force generates a rotational force relative to an axis parallel to the direction in which a driven element is moved relative to a vibrator. Since the attraction force increases more as the distance between the magnetic member and the object to be attracted becomes smaller, the pressure imbalance may be further increased in such case, for example, where a misalignment and/or an inclination occur depending on a mismatch of the dimensional accuracy and/or installation accuracy.

Accordingly, there is a need for those with a structure that causes no such pressure imbalance.

In view of the aforementioned problems, another object of the present invention is to provide a vibratory drive apparatus capable of downsizing a pressure-application structure while necessary pressure is provided, enabling pressure stabilization.

A vibration wave actuator, which is a vibratory drive apparatus according to the present invention, includes: a vibrator including at least an electro-mechanical energy conversion element and an elastic body to which the electro-mechanical energy conversion element is joined, the elastic body including a contact portion formed therein, the vibrator being configured to provide elliptic motion to the contact portion; and a driven element that is in pressure contact with the contact portion of the vibrator, the driven element being moved by the elliptic motion, wherein the vibration wave actuator includes a vibrator holding portion that holds the vibrator via a first elastic member having a stiffness lower than that of the vibrator; and wherein a magnet is arranged on the vibrator holding portion, the driven element includes a magnetic substance, and the contact portion of the vibrator and the driven element are brought into pressure contact with each other by an attraction force of the magnet.

Also, a vibratory drive apparatus according to the present invention includes: a vibrator including an electro-mechanical energy conversion element and a vibration plate to which the electro-mechanical energy conversion element is joined, the vibrator being configured to provide elliptic motion to a contact portion formed on the vibration plate; and a driven element that is in pressure contact with the contact portion of the vibrator, the driven element being moved relative to the vibrator by the elliptic motion, wherein at least a portion of the driven element includes a ferromagnetic substance, thereby providing a first magnetic member; wherein at least a portion of the vibrator includes a ferromagnetic substance, thereby causing the vibrator and a yoke joined to a supporting portion of the vibrator, the yoke extending in a direction of the relative movement of the driven element, to provide a second magnetic member; and wherein a permanent magnet is provided on any one of the first magnetic member and the second magnetic member, and the contact portion of the vibrator is brought into pressure contact with the driven element by an attraction force provided by magnetic forces of the first magnetic member and the second magnetic member.

The present invention enables provision of a vibration wave actuator, which is a vibratory drive apparatus that enhances a pressure-contact force provided by magnetism between a vibrator and a driven element, enabling stabilization of a state of the contact between the vibrator and the driven element.

Also, the present invention enables provision of a vibratory drive apparatus capable of downsizing a pressure-application structure while necessary pressure is provided, enabling pressure stabilization.

Further features of the present invention will become apparent from the following description of exemplary embodiments with reference to the attached drawings.

DESCRIPTION OF THE EMBODIMENTS

Preferred embodiments of the present invention will now be described in detail in accordance with the accompanying drawings.

Modes for carrying out the present invention will be described by means of the embodiments below.

Embodiment 1

An example configuration of a vibration wave actuator, to which the present invention is applied, will be described with reference to FIGS. 3A and 3B. In the vibration wave actuator, a driven element that is in contact with a plurality of vibrators is moved in a plurality of different directions. The example configuration of the present embodiment includes a plurality of vibrators, and the plurality of vibrators is arranged at positions where the directions of forces generated by elliptic motion are different. The configuration is provided so that the driven element that is in pressure contact with the vibrators via contact members of the vibrators is moved in a predetermined movement direction formed by combining the forces in different directions.

Figure 3A:
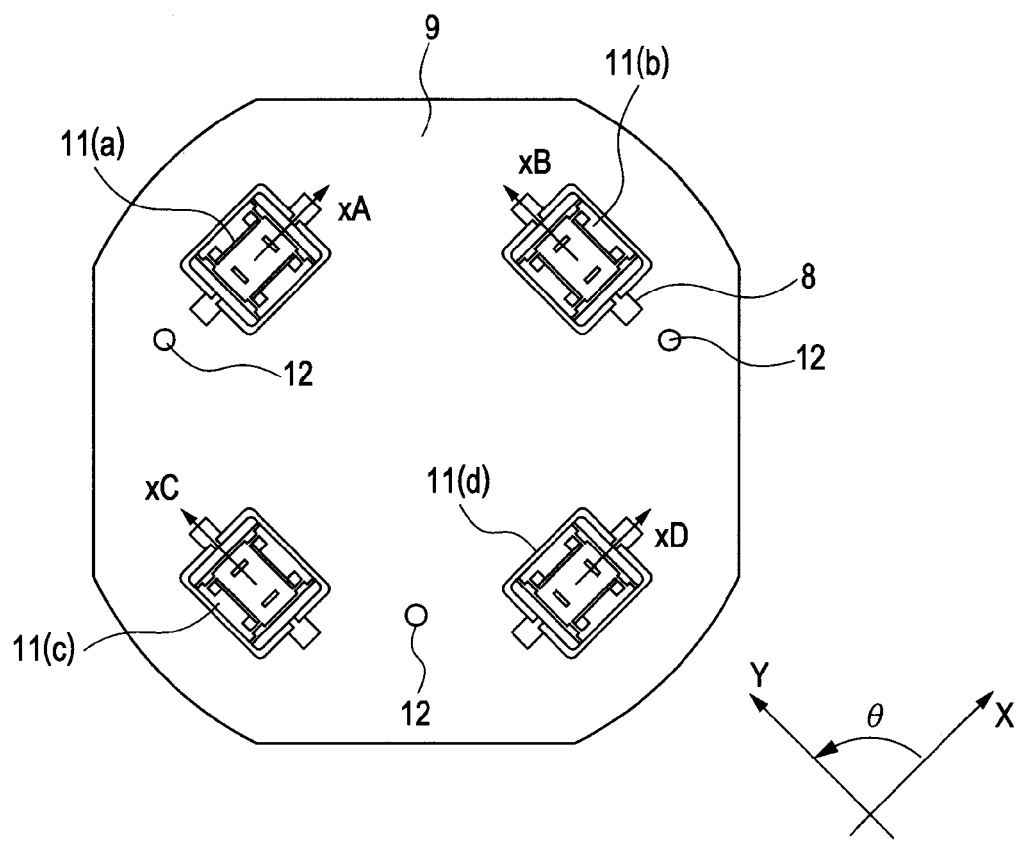
FIG. 3A is a diagram illustrating a configuration of a multidirectional drive mechanism using a vibration wave actuator according to the present invention.
Figure 3B:
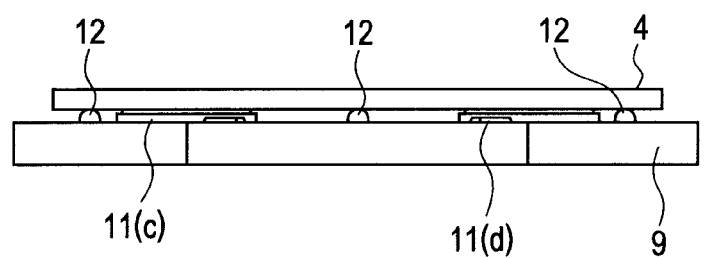
FIG. 3B is a diagram illustrating the configuration of the multidirectional drive mechanism using a vibration wave actuator according to the present invention.

FIG. 3A is a top view of the vibration wave actuator of the present configuration, and FIG. 3B is a side view of the same. In FIG. 3A, a driven element 4 is not illustrated. The configuration in FIGS. 3A and 3B includes: vibrator units 11(*a*), 11(*b*), 11(*c*) and 11(*d*) each including a vibrator according to the present embodiment; the driven element 4; a securing portion 9 that secures the vibrator units 11(*a*), 11(*b*), 11(*c*) and 11(*d*); and a plurality of balls 12 arranged between the driven element 4 and the securing portion 9. The plurality of balls 12 are housed in a plurality of holes arranged in the securing portion 9, respectively. The balls revolve in the holes with movement of the driven element 4, thereby the driven element 4 being freely driven within the plane, and supported so as to constantly have a fixed height relative to the securing portion 9. Furthermore, the vibrator units 11(*a*), 11(*b*), 11(*c*) and 11(*d*) are connected to the securing portion 9 via second elastic members 8.

Here, for ease of description of a basic configuration of the vibrators, a configuration in which a driven element is driven in a single direction will be described.

Figure 6:
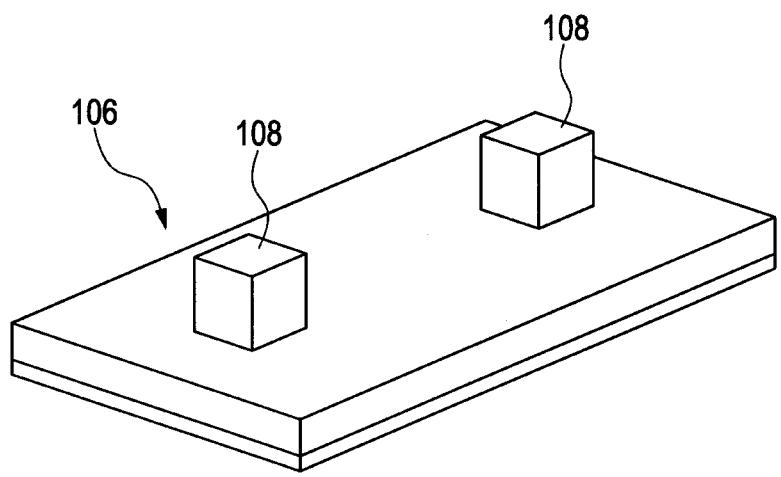
FIG. 6 is a diagram illustrating a configuration of a vibrator used in the present invention.

FIG. 6 is a diagram illustrating a basic configuration of a vibrator mounted in one of the vibrator units.

The details of a drive method is described in Japanese Patent Application Laid-Open No. 2004-320846, and an overview of a configuration enabling projection portions included in contact members of a vibrator to produce elliptic motion will be described herewith.

Figure 7A:
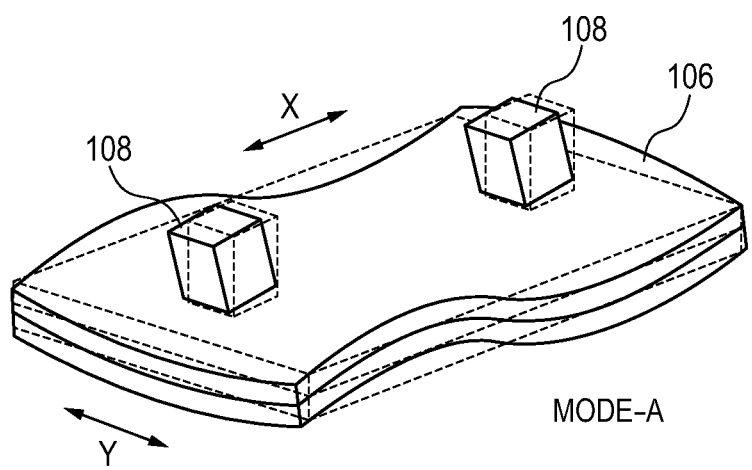
FIG. 7A is a diagram illustrating a bending mode of a vibrator used in the present invention.
Figure 7B:
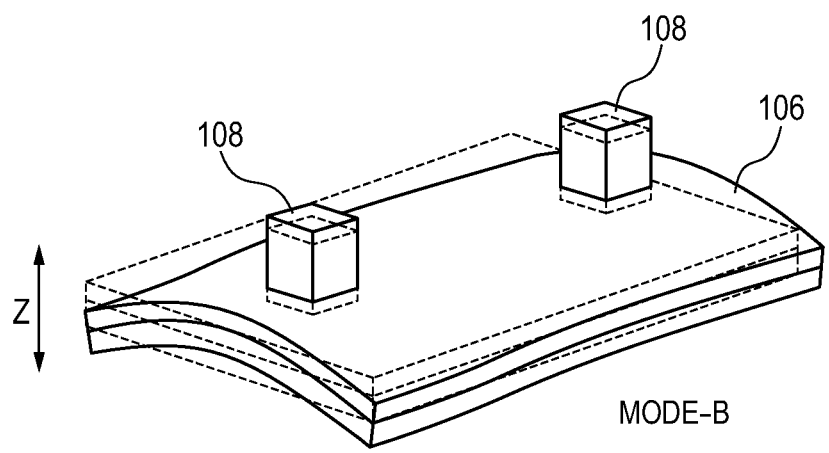
FIG. 7B is a diagram illustrating the other bending mode of a vibrator used in the present invention.

FIGS. 7A and 7B are diagrams illustrating two bending vibration modes of the vibrator. The vibration mode in FIG. 7A represents one bending vibration mode (hereinafter referred to as "MODE-A") of the two bending vibration modes. The MODE-A provides second-order bending motion in a long-side direction (arrow X direction) of a rectangular vibrator 106, and the vibrator 106 includes three nodes parallel to a short-side direction (arrow Y direction) thereof. Here, projection portions 108 included in contact portions are arranged in the vicinity of positions in which nodes are formed in MODE-A vibration, and are reciprocated mainly in the arrow X direction (feed direction) in response to the MODE-A vibration.

The vibration mode illustrated in FIG. 7B represents the other bending vibration mode (referred to as "MODE-B") of the two bending vibration modes. The MODE-B provides first-order bending motion in the short-side direction (arrow Y direction) of the rectangular vibrator 106, and the vibrator 106 includes two nodes parallel to the long side direction (arrow-X direction).

Here, the nodes in the MODE-A and the nodes in the MODE-B are substantially orthogonal to each other in the X-Y plane. Furthermore, the projection portions 108 are arranged in the vicinity of positions in which antinodes are formed by vibrations in the MODE-B, and are reciprocated in an arrow Z direction (upthrust direction) in response to the MODE-B vibration.

The above-described MODE-A and MODE-B vibrations are generated with a predetermined phase difference, causing elliptic motion at extremities of the projection portions 108 to provide a driving force in the arrow X direction in FIG. 7A.

The principle of driving the vibration wave actuator according to the present embodiment in which a driven element that is in contact with a plurality of vibrators is moved in a plurality of different directions will be described.

In FIGS. 3A and 3B, when the driven element 4 is intended to be moved in the X-direction of coordinates illustrated in the Figures, a driving force in an arrow xA direction is provided to the vibrator in the vibrator unit 11(*a*), and a driving force in an arrow xD direction is provided to the vibrator in the vibrator unit 11(*d*). Concurrently, only the above-described MODE-B vibration is provided to the vibrator in the vibrator unit 11(*b*) and the vibrator in the vibrator unit 11(*c*). With the vibration, a load imposed on a surface of contact between the vibrators in the vibrator units 11(*b*) and 11(*c*) and the driven element 4 is reduced, and the driving forces from the vibrators in the vibrator units 11(*a*) and 11(*d*) are conveyed to the driven element 4 with no wastage, and the driven element 4 is driven in the X-direction. When the driven element 4 is intended to be driven in the Y direction, the MODE-B vibration may be provided to the vibrators in the vibrator units 11(*a*) and 11(*d*), as well as providing a driving force in an arrow xB direction to the vibrator in the vibrator unit 11(*b*) and a driving force in an arrow xC direction to the vibrator in the vibrator unit 11(*c*).

The driving forces of the vibrators in the vibrator units 11(*a*) and 11(*d*) are made to be equal to each other and are each determined as a force vector Fx, and also the driving forces of the vibrators in the vibrator units 11(*b*) and 11(*c*) are made to be equal to each other and are each determined as a force vector Fy. Consequently, combination of the force vectors Fx and Fy enables driving the driven element 4 in any direction.

Although the present embodiment employs four vibrators, the number of vibrators used for providing a vibration wave actuator that is driven in a plurality of direction as described above is not limited as long as the number is no less than two.

Figure 1A:
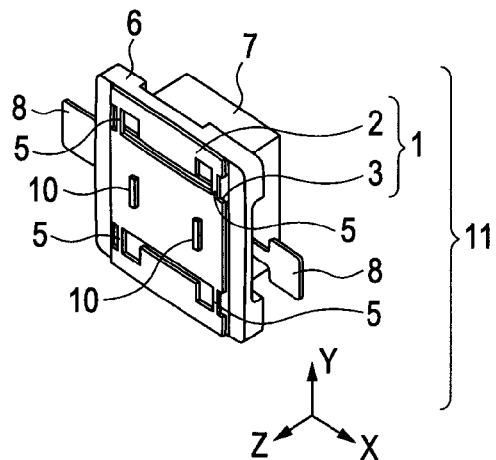
FIG. 1A is a perspective view illustrating a configuration of a vibration wave actuator according to embodiment 1 of the present invention.
Figure 1B:
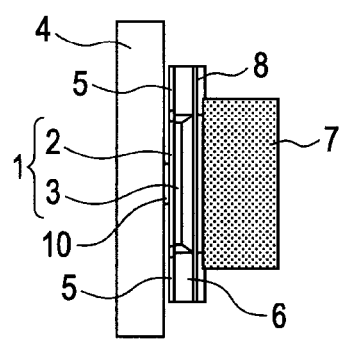
FIG. 1B is a side view illustrating a configuration of the vibration wave actuator according to embodiment 1 of the present invention.
Figure 1C:
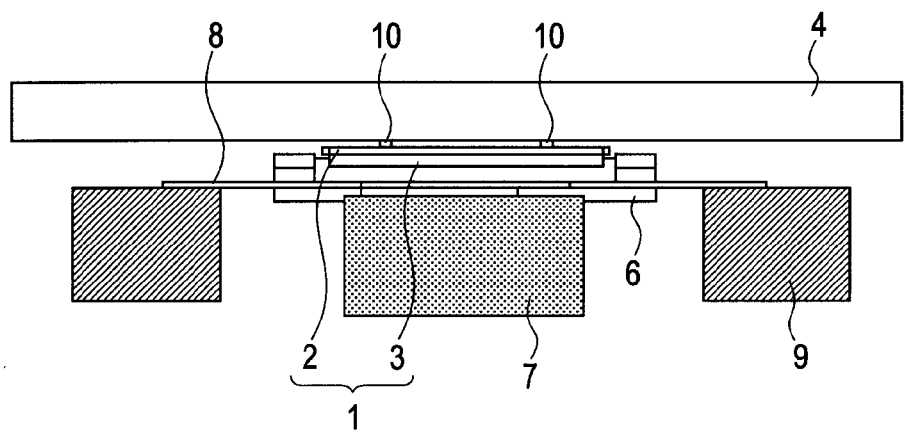
FIG. 1C is a front view illustrating a configuration of the vibration wave actuator according to embodiment 1 of the present invention.
Figure 1D:
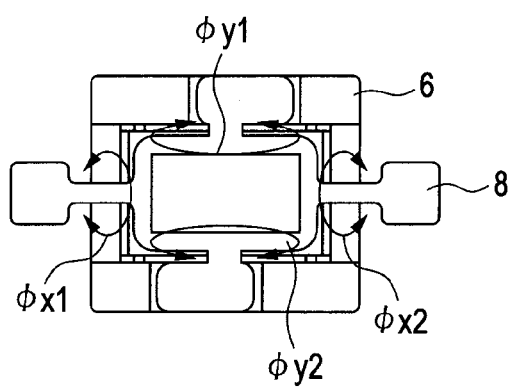
FIG. 1D is a behind view illustrating a configuration of the vibration wave actuator according to embodiment 1 of the present invention.

Next, an example configuration of a vibrator unit according to the present embodiment will be described with reference to FIGS. 1A, 1B, 1C and 1D. FIG. 1A is a perspective view of a vibrator unit 11 according to embodiment 1, which is the present embodiment. FIG. 1B is a cross-sectional view of a vibration wave actuator according to embodiment 1, at which position the vibration wave actuator mounts a vibrator unit and 11(d) a driven element 4, viewed in the X-direction. FIG. 1C is a cross-sectional view of the vibration wave actuator according to embodiment 1, at which position the vibration wave actuator mounts a vibrator unit 11(d) and a driven element 4, viewed in the Y direction. FIG. 1D is a back view of the vibration wave actuator in which a magnet is not illustrated.

In FIGS. 1A, 1B, 1C and 1D, a vibrator 1 is configured by joining a vibration plate 2, which includes an elastic body of, e.g., a metal, and an electro-mechanical energy conversion element 3 such as a piezoelectric element. A driven element 4 includes a magnetic substance. Projection portions 10, which are the above-described contact portions, are formed on the elastic body.

The vibrator 1 is connected to a vibrator holding portion 6 via first elastic members 5 formed by narrowing the width of parts of the vibration plate 2 so as to have a stiffness lower than that of the vibrator as well as to have elasticity. As a result of the vibrator 1 being held as described above, vibration is unlikely to be hindered. A magnet 7 is held by the vibrator holding portion 6 so that the driven element 4 is attracted toward the vibrator 1 via the vibrator 1. In the present embodiment, a vibrator unit 11 includes at least the vibrator 1, the vibrator holding portion 6 and the magnet 7. In the vibration wave actuator according to the present embodiment, the driven element 4, the vibrator 1, the vibrator holding portion 6 and the magnet 7 are aligned in a pressure-application direction.

The vibrator holding portion 6 is connected to a securing portion 9 via second elastic members 8. The stiffness of the first elastic members 5 is higher than a stiffness of the second elastic members 8. Since the stiffness of the second elastic members 8 is lower than that of the first elastic members 5, it is possible to prevent the first elastic members 5 from deforming when a force urging the vibrator 1 to incline is imposed on surfaces of the projection portions 10 on the vibrator 1, which are in contact with the driven element 4.

Only the second elastic members 8 elastically deform so as to rotate in the directions of arrows φx1, φx2, φy1 and φy2 in FIG. 1D. In other words, when the projection portions 10 and the driven element 4 are brought into pressure contact with each other, the second elastic members elastically deform so that the vibrator holding portion follows the driven element 4. Here, the vibrator 1 and the vibrator holding portion 6 move integrally accompanying the elastic deformation of the second elastic member 8, and thus, the contact between the vibrator 1 and the driven element 4 is stabilized. Since the state of the contact between the vibrator and the driven element largely affects the output characteristics, the above-described configuration enables suppression of a decrease in the output characteristics.

As a result of arranging the magnet on a side opposite to the side on which the projection portions of the vibrator are provided as described above, there is no restriction in terms of the size, in particular, the size in the magnetization direction of the magnet, and thus, a magnet having a larger attraction force can be used and a large pressure can arbitrarily be set.

In FIGS. 1A, 1B, 1C and 1D, the size in the X-Y plane of the magnet 7 is smaller than the size in the X-Y plane of the driven element 4, and in such state, a magnetic circuit has only a small change when the driven element 4 is moved in an arbitrary direction within the X-Y plane. Thus, change in attraction force due to a magnetic force can be reduced.

Furthermore, where the vibration plate (elastic body) 2 includes a magnetic substance, the following effect can be provided.

Figure 2A:
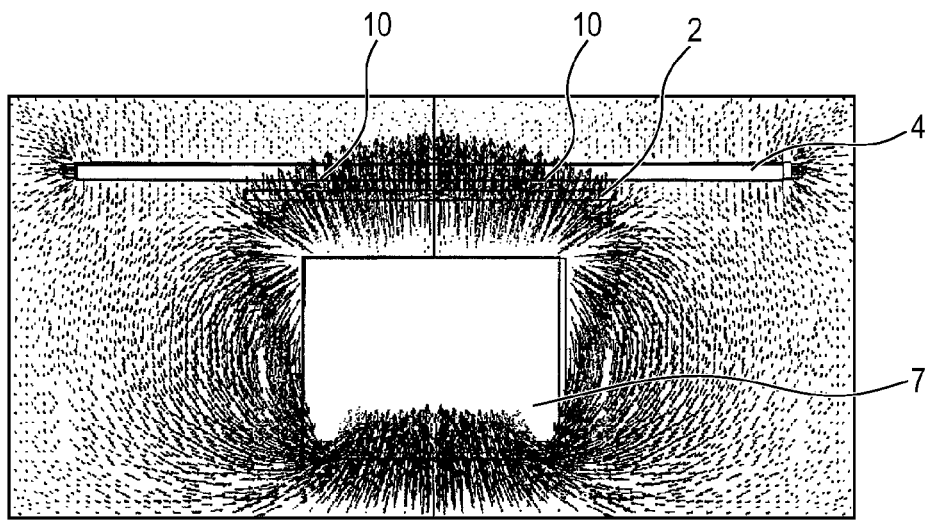
FIG. 2A is a diagram illustrating a magnetic flux distribution in the configuration according to embodiment 1 of the present invention.
Figure 2B:
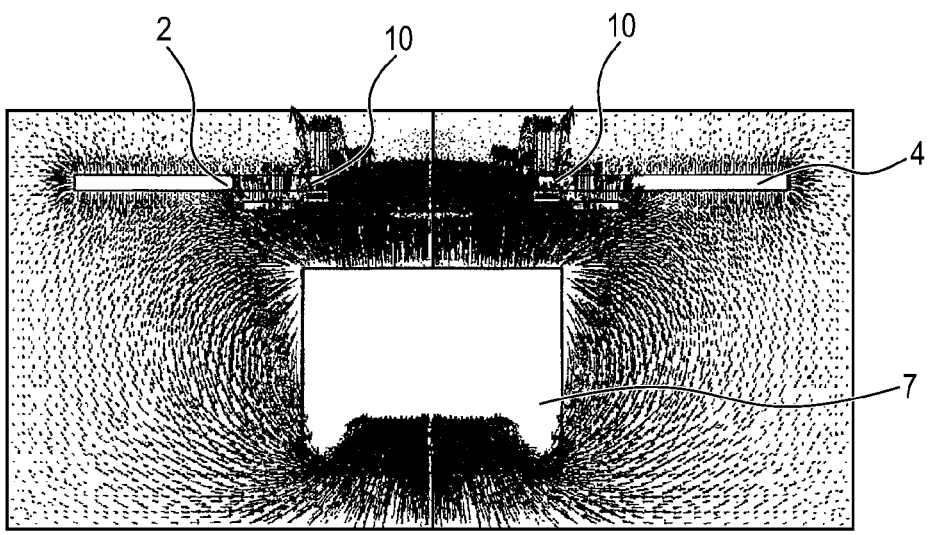
FIG. 2B is a diagram illustrating a magnetic flux distribution in the configuration according to embodiment 1 of the present invention.

FIGS. 2A and 2B illustrate simulation results of magnetic flux density distributions in the configuration according to the present embodiment. FIG. 2A illustrates a magnetic flux density distribution when the vibration plate includes no magnetic substance, and FIG. 2B illustrates a magnetic flux density distribution when the vibration plate includes a magnetic substance. In FIG. 2A, the magnetic flux between the magnet 7 and the driven element 4 are scarce and dispersed. However, in FIG. 2B, the magnetic flux between the magnet 7, and the vibration plate 2 and the driven element 4 is dense, and the magnetic flux concentrates around the vibration plate 2 and the contact portions between the projection portions 10 provided on the vibration plate 2 and the driven element 4. Accordingly, it is possible to increase the pressure. As the material of the driven element 4 of the present invention magnetic substance may be used. And, as the magnet 7 used in the invention it is desirable to use permanent magnets. In addition, it is desirable to use a ferromagnetic substance as the magnetic sub stance.

Embodiment 2

Figure 4:
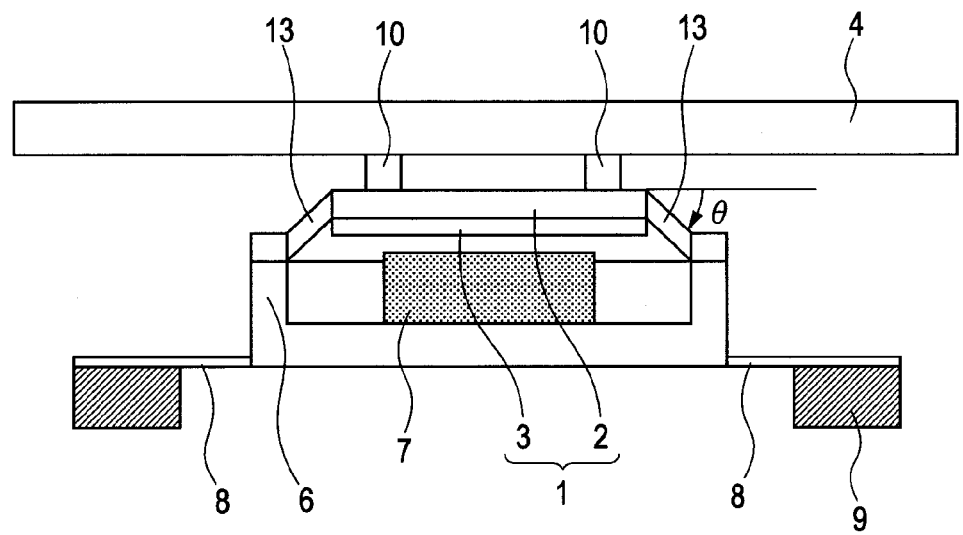
FIG. 4 is a diagram illustrating a configuration of a vibration wave actuator according to embodiment 2 of the present invention.

An example configuration of a vibration wave actuator according to embodiment 2 will be described with reference to FIG. 4. The overall configuration of the vibration wave actuator is generally similar to the configuration in FIGS. 3A and 3B, which have been described in embodiment 1, and thus, a description thereof will be omitted. The present embodiment will be described only in terms of differences from embodiment 1. A vibrator 1 is configured by joining a vibration plate 2, which includes an elastic body of, e.g., a metal, and an electro-mechanical energy conversion element 3. A driven element 4 includes a magnetic substance.

The vibrator 1 is connected to a vibrator holding portion 6 via first elastic members 13 formed by narrowing parts of the vibration plate 2 to have a stiffness lower than that of the vibrator as well as to have elasticity. As a result of holding the vibrator 1 as described above, vibration is unlikely to be hindered. Each first elastic member 13 is provided in a range of 0°<θ<180° so that the distance between the vibrator 1 and the vibrator holding member 6 is large. A magnet 7 is provided between the vibrator holding portion 6 and the vibrator 1, and the magnet 7 is held integrally with the vibrator holding portion 6 so that the driven element 4 is attracted toward the vibrator 1 via the vibrator 1. The driven element 4, the vibrator 1, the vibrator holding portion 6 and the magnet 7 are aligned in a pressure-application direction.

Furthermore, the vibrator holding portion 6 is connected to a securing portion 9 via second elastic members 8. The stiffness of the first elastic members 13 is higher than a stiffness of the second elastic members 8.

In embodiment 1, the magnet is arranged on a surface opposite to the vibrator side of the vibrator holding portion 6, and thus, it is difficult to narrow the gap between the driven element 4 and the magnet 7. Meanwhile, as a result of the magnet being arranged between the vibrator holding portion and the vibrator on the vibrator side of the vibrator holding portion as in the present embodiment, the gap between the driven element 4 and the magnet 7 can be reduced compared to embodiment 1. Accordingly, the pressure can be increased compared to embodiment 1.

Embodiment 3

Figure 5:
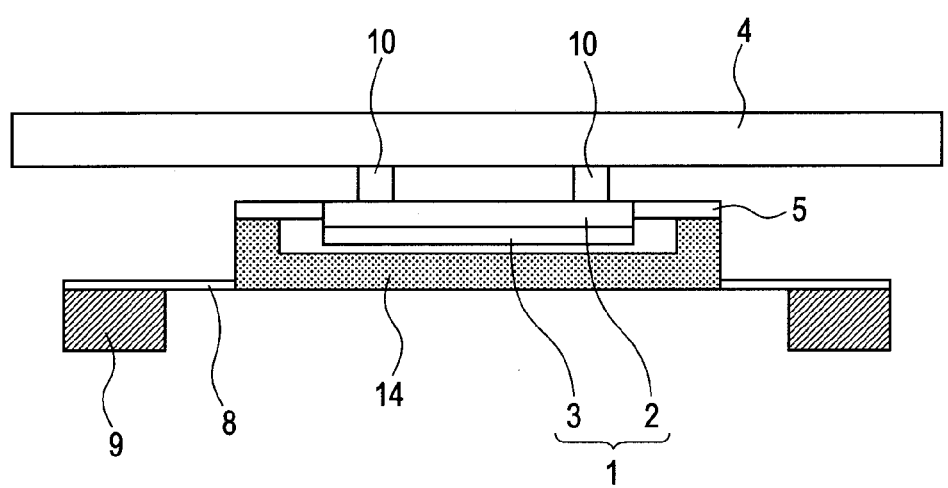
FIG. 5 is a diagram illustrating a configuration of a vibration wave actuator according to embodiment 3 of the present invention.

An example configuration of a vibration wave actuator according to embodiment 3 will be described with reference to FIG. 5. The overall configuration of the vibration wave actuator in this embodiment is generally similar to those of embodiments 1 and 2. A description will be provided only in terms of differences from embodiments 1 and 2. The vibrator 1 is configured by joining a vibration plate 2, which includes an elastic body of, e.g., a metal, and an electro-mechanical energy conversion element 3. A driven element 4 includes a magnetic substance.

The vibrator 1 is connected to a vibrator holding magnet 14, which includes a magnet, via first elastic members 5 formed by narrowing the width of parts of the vibration plate 2 to have a stiffness lower than that of the vibrator as well as to have elasticity. As a result of the vibrator 1 being held as described above, vibration is unlikely to be hindered.

The vibrator holding magnet 14 attracts the driven element 4 toward the vibrator 1 via the vibrator 1. The vibrator holding magnet 14 is also connected to a securing portion 9 via second elastic members 8. The stiffness of the first elastic members 5 is higher than a stiffness of the second elastic members 8.

In embodiment 1, it is difficult to reduce the size in the thickness direction because the vibrator holding portion and the magnet are formed by separate components. However, with the configuration of the present embodiment, the magnet and the vibrator holding portion are integrated, enabling thickness reduction compared to embodiment 1.

Embodiment 4

In other aspects of the vibratory drive apparatus according to the present invention, a yoke for collecting magnetic lines of force of a magnet to efficiently use an attraction force the magnet has is made to extend in a direction of relative movement of a driven element. Then, a supporting portion for a vibrator, which is formed in the vibrator, and the yoke are joined.

As a result of the yoke being arranged along the driven element as described above, a magnetic force can be generated between the yoke and the driven element. Furthermore, at least parts of a vibration plate included in the vibrator include a ferromagnetic substance, and such parts can also generate magnetic pressure to attract the driven element.

Furthermore, as a result of employing a configuration in which only contact portions of the vibrator, which are in contact with the driven element, include a ferromagnetic substance, a magnetic attraction force can easily be generated because of the contact with the driven element, and the contact portions directly generate pressure, enabling suppression of a rotational force relative to an axis parallel to the relative movement direction. Furthermore, as a result of employing a configuration in which the supporting portion formed in the vibrator is made to extend in the direction of the relative movement of the driven element to join the supporting portion to a yoke, the vibrator can be held and secured by the yoke.

As a result of employing a configuration in which a joint portion between the supporting portion formed in the vibrator and the yoke is made to have a width narrower than the width of the driven element, the yoke can generate a large attraction force at the joint portion. The attraction force can be made to be close to the contact portions, enabling suppression of generation of a rotational force relative to the axis parallel to the relative movement direction of the driven element.

As embodiment 4, an example configuration of an ultrasonic motor (vibratory drive apparatus), to which the present invention is applied, will be described with reference to FIG. 8. An ultrasonic motor 210, which is a vibratory drive apparatus according to the present embodiment, mainly includes a vibrator 201, and a driven element 206 held by the vibrator 201 in such a manner that the driven element 206 is in pressure contact with the vibrator 201. The vibrator 201 includes a piezoelectric element (electro-mechanical energy conversion element) 213, and a vibration plate 211 including an elastic body, to which the piezoelectric element 213 is joined. On the vibration plate 211, contact portions 212, which are in contact with the driven element, are provided. The driven element 206 includes an iron-based metal, which is a ferromagnetic substance, and portions of the driven element 206 that are in contact with the vibrator 201 have been subjected to processing for enhancing abrasion resistance, such as nickel plating. The driven element 206 acts as a first magnetic member.

Furthermore, a yoke 203 for collecting magnetic lines of force is provided. The yoke 203 can be joined to supporting portions 211-2 (see FIG. 10A) formed in the vibrator 201. Furthermore, a planar surface of a magnet member 204 is connected to a planar surface of the yoke 203, and the aforementioned components from the vibrator 201 to the magnetic member 204 are held and secured by a holding member 205. In addition to the aforementioned components, the ultrasonic motor includes, e.g., a flexible substrate (not illustrated) that provides electric connection between the vibrator 201 and the outside, and a guide member (not illustrated) for the driven element 206.

Figure 9A:
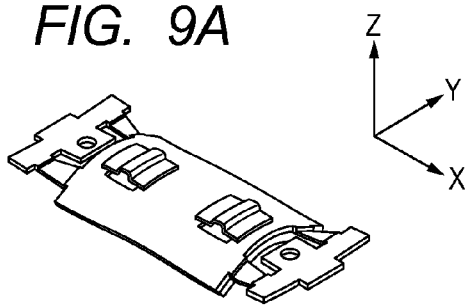
FIG. 9A is a perspective view illustrating a vibration mode of a vibrator in embodiment 4 of the present invention.
Figure 9B:
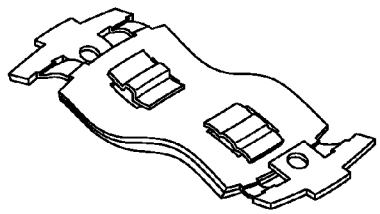
FIG. 9B is a perspective view illustrating a vibration mode of a vibrator in embodiment 4 of the present invention.

In order to make the ultrasonic motor 210 operate, an alternate voltage is applied to the piezoelectric element 213 to excite the vibrator 201 to enter two out-of-plane bending modes. FIGS. 9A and 9B illustrate shapes of a vibration portion 211-1 in the vibration modes used in this case. MODE-C illustrated in FIG. 9A is a first-order out-of-plane bending mode in which two nodes appear in the vibration portion 211-1 in parallel to an X-direction in the Figure. With the MODE-C vibration, contact portions are excited to have a vibration amplitude for displacement in a Z-axis direction (direction perpendicular to the vibration plate 211). MODE-D illustrated in FIG. 9B is a second-order out-of-plane bending mode in which three nodes appear in the vibration portion 211-1 substantially in parallel to a Y direction in the Figure. With the MODE-D vibration, the contact portions are excited to have a vibration amplitude for displacement in an X-axis direction (direction parallel to the vibration plate 211).

Combination of these two modes enables production of elliptic motion on the surfaces of the contact portions 212. The elliptic motion makes the driven element 206, which is in pressure contact with the contact portions 212, move relative to the vibrator.

Figure 8:
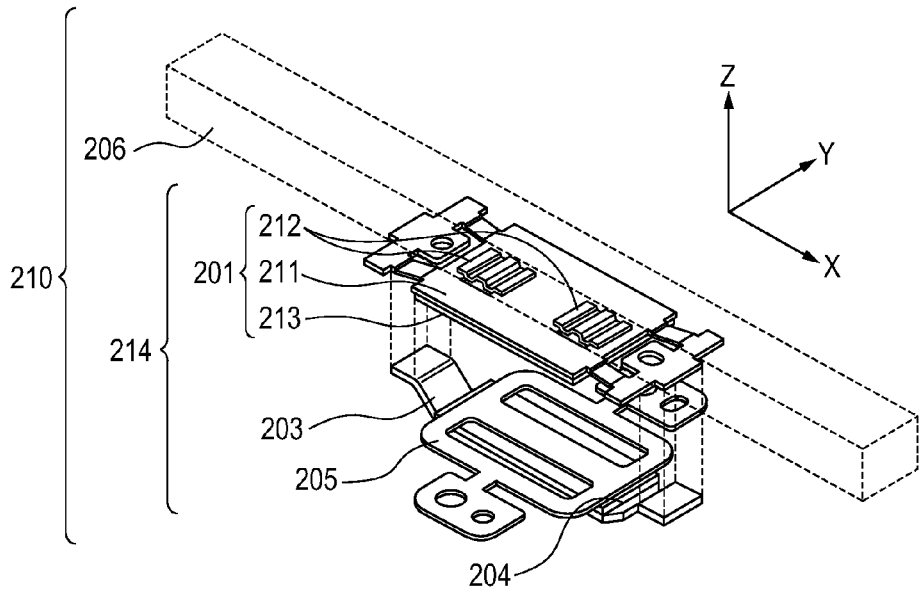
FIG. 8 is a perspective view illustrating a configuration of an ultrasonic motor (vibratory drive apparatus) according to embodiment 4 of the present invention.
Figure 10A:
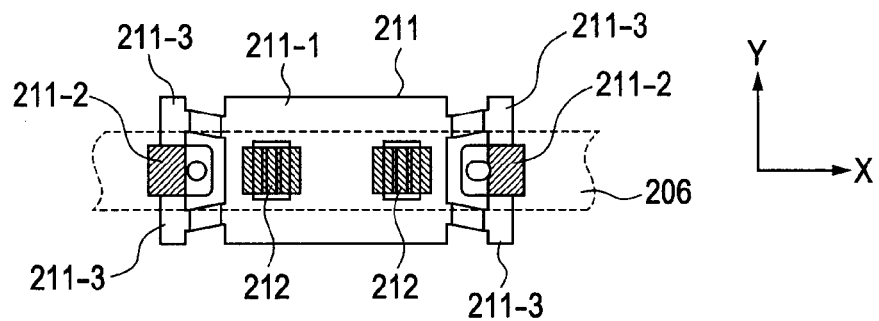
FIG. 10A is a plan view illustrating a configuration of an ultrasonic motor according to embodiment 4 of the present invention.
Figure 10B:
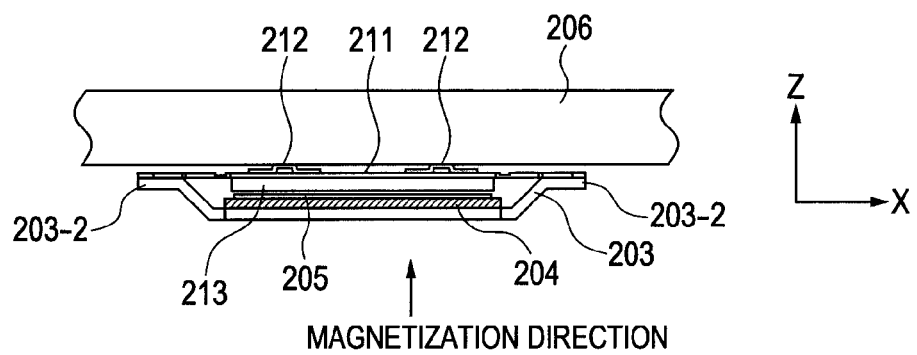
FIG. 10B is a front view illustrating the configuration of the ultrasonic motor according to embodiment 4 of the present invention.
Figure 10C:
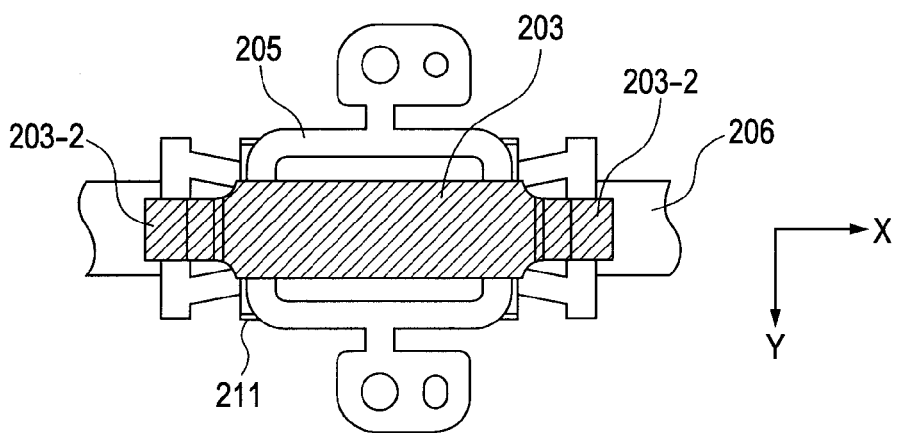
FIG. 10C is a plan view illustrating a configuration of, mainly, a yoke portion of the ultrasonic motor according to embodiment 4 of the present invention.

FIGS. 10A, 10B and 10C illustrate the ultrasonic motor in FIG. 8 viewed from respective directions.

FIG. 10A is a plan view of the ultrasonic motor, which mainly illustrates a configuration of the vibrator 201. As illustrated in FIG. 10A, the vibrator 201 includes a vibration plate 211 prepared by forming a paramagnetic substance metal material, such as aluminum, into a plate-like shape. The vibration plate 211 includes a substantially rectangular vibration portion 211-1, connection portions 211-3 extending from side surfaces of the vibration portion 211-1 so as to face each other, and supporting portions 211-2 formed at end portions of the connection portions 211-3. Contact portions 212 including a ferromagnetic substance such as an iron-based metal are secured to two positions in a planar portion of the vibration portion 211-1.

A piezoelectric element 213 (electro-mechanical energy conversion element) is connected to another surface of the vibration portion 211-1, as illustrated in FIG. 10B. The vibrator 201 has a shape that is substantially symmetrical in the X and Y directions illustrated in FIG. 10A. A driven element 206 is arranged on a surface side including the contact portions 212 of the vibrator 201.

The positions of the vibrator 201 and the driven element 206 are determined so that the centers in the Y direction of the vibrator 201 and the driven element 206 correspond to each other when viewed in the Z direction. The vibrator 201 and the driven element 206 move in relation to each other in the X-direction. The supporting portions 211-2 are arranged at positions where the supporting portions 211-2 is overlapped by the driven element 206 when viewed in the Z direction. Furthermore, the supporting portions 211-2 each have a width narrower than that of the driven element 206.

As illustrated in FIGS. 10B and 10C, the two supporting portions 211-2 extend from the vibration portion 211-1 of the vibrator in the X-direction, and yoke end portions 203-2, which are opposite ends of the yoke 203 extending from the X-direction in the Figures, are connected to surfaces of the two supporting portion 211-2 opposite to a surface facing the driven element 206.

The width of the yoke end portions 203-2 have been formed so as to be the same as or narrower than that of the supporting portions 211-2. A magnetic member 204 is arranged in a portion of the yoke 203 near the piezoelectric element plate 213. The magnetic member 204 has been subjected to processing for magnetization in the Z direction in the Figures. A holding member 205 extending in the Y direction in the Figures is secured to the magnetic member 204. The holding member 205 includes a plate of phosphor-bronze, which is a paramagnetic substance, and has an elastic structure having a plate-spring shape. Opposite ends in the Y direction in the Figures of the holding member 205 are held by and secured to a non-illustrated frame body.

These components are included in the drive member 214 (see FIG. 8) and the drive member 214 generates a force for movement in the X direction in the Figures relative to the driven element 206. The drive member 214 is held by the holding member 205, and the elastic structure of the holding member 205 provides a deformation degree of freedom mainly with reference to the Z direction and the X and Y axes in the Figures. Thus, even though a deviation from a desired positional relationship is caused between the drive member 214 and the driven element 206, the drive member 214 and the driven element 206 are in contact with each other by means of a magnetic attraction force so as to follow each other.

In the present embodiment, the magnetic member 204, the yoke 203 and the two contact portions 212 including a ferromagnetic substance in the drive member 214, which have been described above, form a second magnetic member. Magnetic lines of force running from a top surface in the Y direction, that is, the vicinity of the vibrator, of magnetic member 204 are directed substantially in the Y direction and partially pass through the contact portions 212. The magnetic lines of force pass through the driven element 206, which is the first magnetic member. Furthermore, a part of the magnetic lines of force running from the magnetic member 204 directly pass through the driven element 206. A part of the magnetic lines of force passing through the driven element 206 is directed to the ends extending in the X-direction of the yoke 203. The magnetic lines of force passing through the yoke 203 return to the magnetic member 204 connected to the yoke 203.

As a result of the magnetic lines of force running as described above, a magnetic force of the magnetic member 204 can effectively be used for an attraction force between the drive member 214 and the driven element 206.

The above-described configuration of the present embodiment enables provision of an ultrasonic motor with the following configurations. A configuration in which the magnetic member 204 is arranged in the vicinity of the vibrator to reduce the distance between the magnetic member 204 and the driven element 206, thereby obtaining an attraction force can be employed. Also, a configuration in which contact portions 212 include a ferromagnetic substance to collect magnetic forces generated from the magnetic member 204 into the contact portions 212 can be employed. Furthermore, a configuration in which the contact portions 212 are made into direct contact with the driven element 206 to effectively generate an attraction force can be employed.

Furthermore, a configuration in which the yoke 203 is formed so as to be connected to the supporting portions 211-2 and the yoke 203 is positioned in the vicinity of the driven element 206 to effectively generate an attraction force also between the driven element 206 and the yoke 203 can be employed. Furthermore, a configuration in which the yoke 203 and the magnetic member 204 are made into direct contact with each other to collect magnetic lines of force can be employed. Furthermore, a configuration in which the yoke also acts so as to hold the vibrator 201, eliminating the need to provide a separate part for holding the vibrator 201 can be employed.

Furthermore, a configuration in which in the drive member 214, a force of attracting the driven element 206 is generated mainly by the contact portions 212 and the yoke end portions 203-2, which are components concentrating in the vicinity of the center in the Y direction in FIGS. 10A, 10B and 10C can be employed. Consequently, even when a misalignment in the Y direction occurs between the drive member 214 and the driven element 206, generation of a moment around the X axis by a magnetic force can be suppressed.

The above-described configurations of the present embodiment enable generation of a sufficient attraction force caused by a magnetic force, that is, a sufficient pressure applied to the drive member 214 and the driven element 206 with small components. Furthermore, a biased pressure caused by a misalignment between the drive member and the driven element 206 can be reduced.

Embodiment 5

As embodiment 5, an example configuration of an ultrasonic motor (vibratory drive apparatus) in a mode different from that of the embodiment 4 will be described with reference to FIG. 11. A description of components similar to those in embodiment 1, which are illustrated in FIGS. 8 and 10A to 10C, will be omitted.

In the present embodiment, a vibration plate 211 includes an iron-based ferromagnetic metal. In the case of the present embodiment, contact portions 212 may be provided by subjecting the vibration plate 211 to press molding to form projections. Although as in embodiment 4, separate members may be secured to the vibration plate 211 as the contact portions 212, the press molding can simplify the process and reduce the cost.

A holding member 205, a yoke 203 and a magnetic member 204 are arranged in this order from a vibrator 1 toward the lower side in the Z direction in the Figures. Yoke end portions 203-2 of the yoke 203, as with the one illustrated in FIG. 8, are connected to supporting portions 211-2 of the vibrator. In the present embodiment, in addition to the magnetic member 204, the yoke 203 and the holding member 205, the vibration plate 211 acts as a second magnetic member. Also, the yoke 203, the vibration plate 211 and the contact portions 212 have a same magnetic polarity.

According to the present embodiment, the vibration plate 211, positioned in the vicinity of the driven element 206 which is acting as a first magnetic member, acts as a magnetic member, enabling more effective generation of an attraction force, that is, pressure applied to a drive member 214 and a driven element 206.

Embodiment 6

Figure 12:
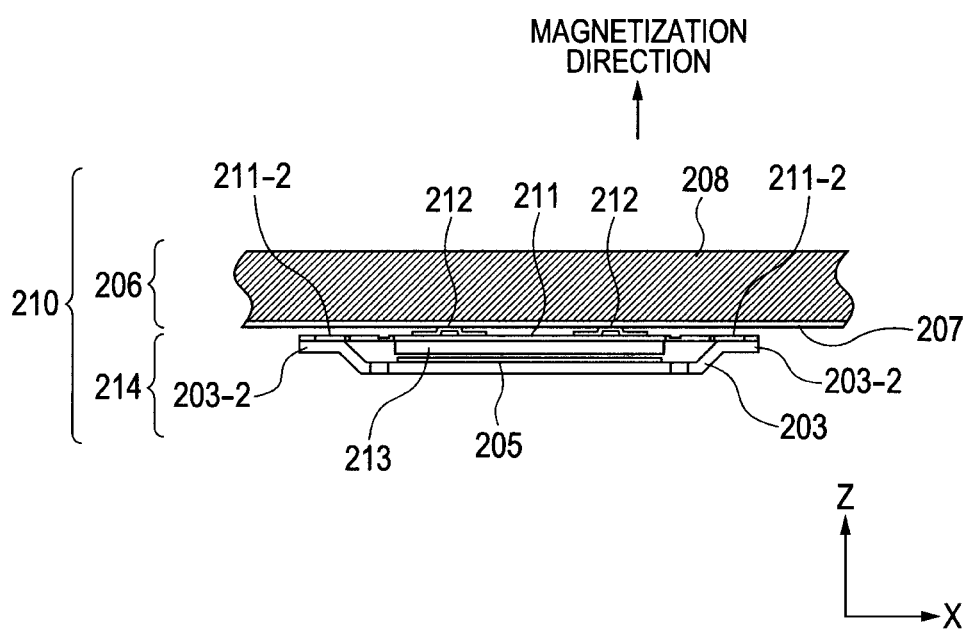
FIG. 12 is a front view illustrating a configuration of an ultrasonic motor according to embodiment 6 of the present invention.

As embodiment 6, an example configuration of an ultrasonic motor (vibratory drive apparatus) in a mode in which embodiment 5 has been varied will be described with reference to FIG. 12.

In the present embodiment, a driven element 206 is formed by connecting a permanent magnet 208 and a friction member 207. The friction member 207 is used with its hardness enhanced by subjecting a martensitic stainless steel, which is a ferromagnetic substance, to quenching. Also, here, no magnetic member is provided in a drive member 214. Effects similar to those in embodiment 5 can also be provided where a permanent magnet is arranged on a first magnetic member side as in the present embodiment.

Embodiment 7

Figure 13:
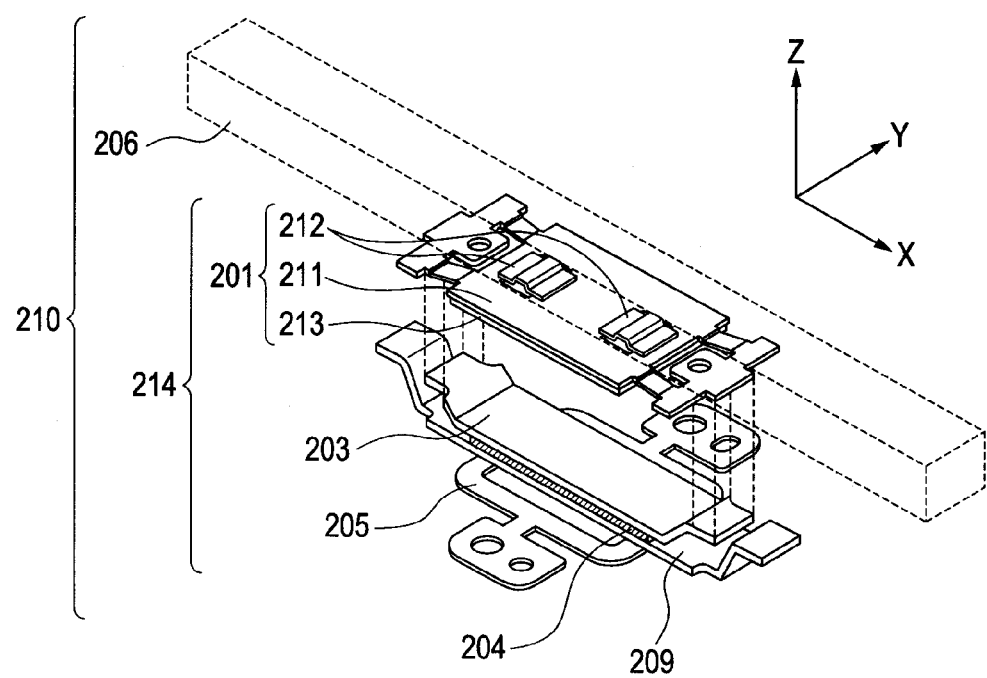
FIG. 13 is a perspective view illustrating a configuration of an ultrasonic motor according to embodiment 7 of the present invention.
Figure 14A:
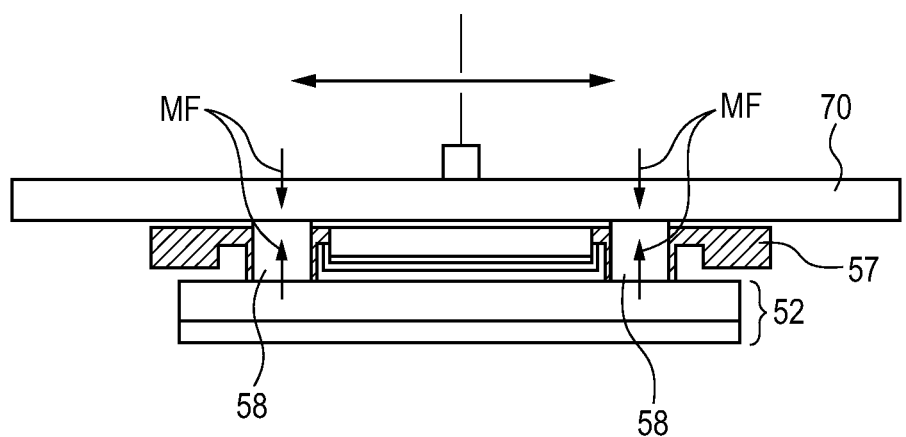
FIG. 14A is a diagram illustrating a configuration of a vibration wave actuator according to Japanese Patent Application Laid-Open No. 2007-312519, which is a conventional example.
Figure 14B:
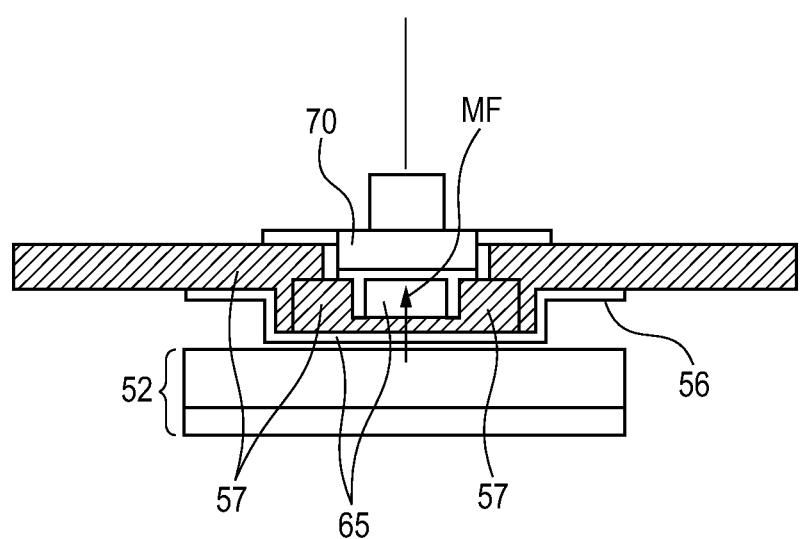
FIG. 14B is a diagram illustrating the configuration of the vibration wave actuator according to Japanese Patent Application Laid-Open No. 2007-312519, which is a conventional example.
Figure 15A:
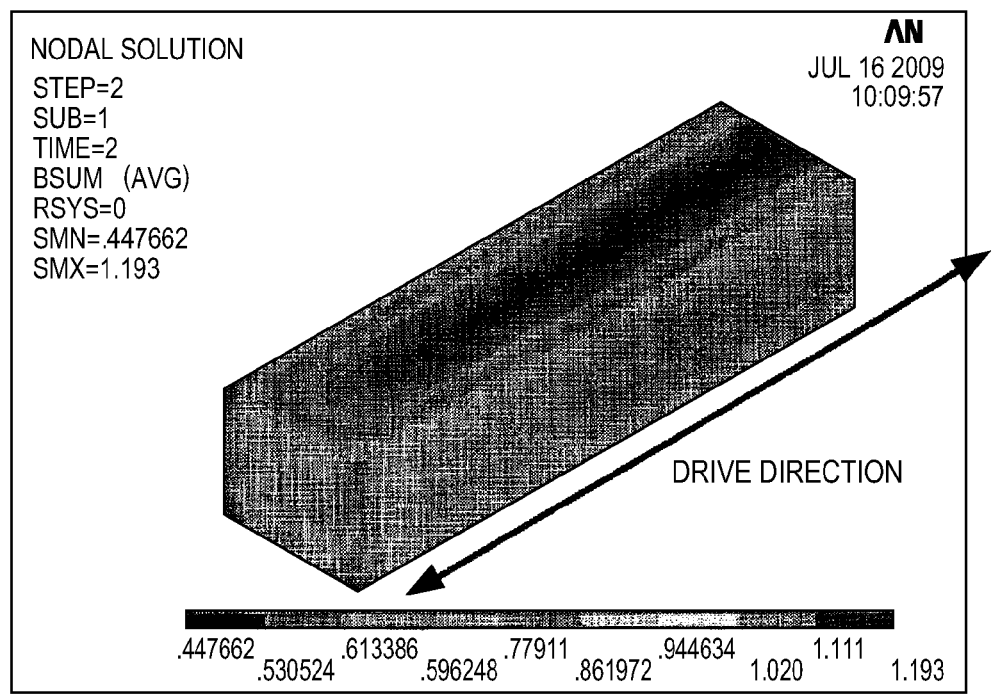
FIG. 15A is a diagram illustrating a non-uniform magnetic flux distribution, which is a problem to be solved by the present invention.
Figure 15B:
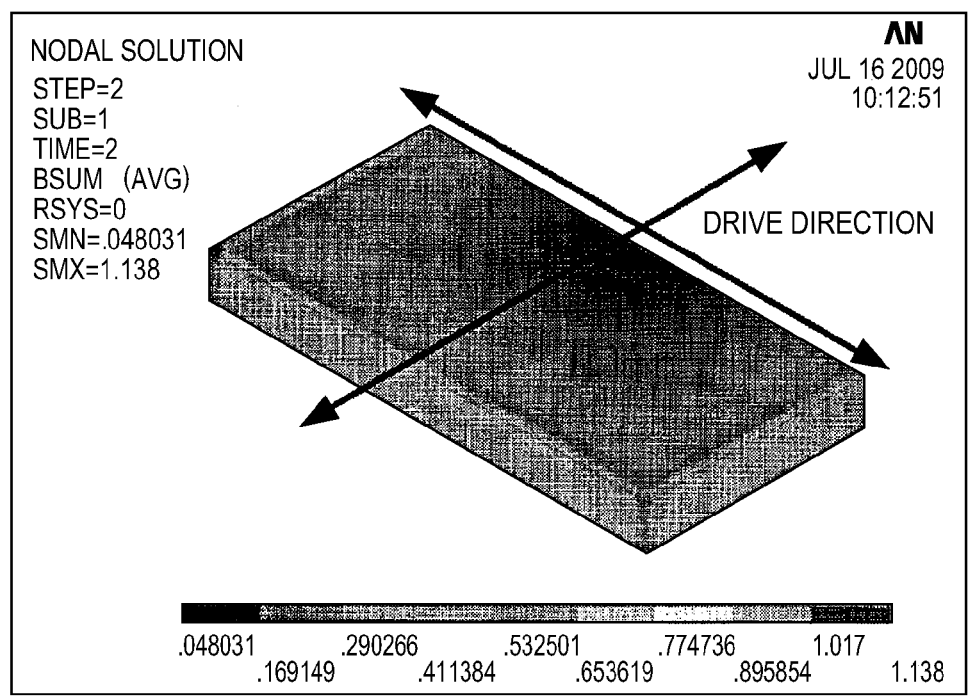
FIG. 15B is a diagram illustrating a non-uniform magnetic flux distribution, which is a problem to be solved by the present invention.

As embodiment 7, an example configuration of an ultrasonic motor (vibratory drive apparatus) in a mode that is different from that of embodiment 6, which is an variation of embodiment 5, will be described with reference to FIG. 13.

Figure 11:
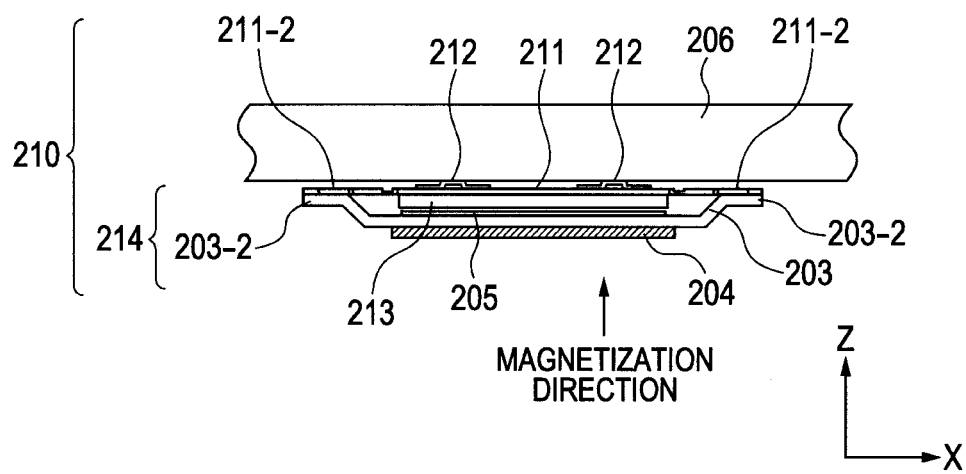
FIG. 11 is a front view illustrating a configuration of an ultrasonic motor according to embodiment 5 of the present invention.

In the present embodiment, a second yoke 209 is arranged on an open surface of the magnet 204 in the mode illustrated in FIG. 11. Opposite ends of the second yoke 209 extend in an X-direction in the Figure and toward the vicinity of a bottom surface of a driven element 206. The second yoke end portions 209-2 are formed so as to have a width narrower than the width of the driven element 206.

As a result of employing a configuration in which a permanent magnet is arranged on a yoke (first yoke) and a second yoke extending in the direction of the relative movement of the driven element is provided on the permanent magnet arranged on the first yoke, a large pressure can be generated.

In other words, the first yoke, the permanent magnet, the second yoke and the magnetic member formed on the driven element are included in a magnetic circuit, enabling generation of a large pressure.

Arrangement of the second yoke 209 as in the present embodiment enables further enhancement of an attraction force, that is, pressure applied to the drive member 214 and the driven element 206.

Furthermore, in the present embodiment, a vibration plate 211 may include a paramagnetic substance. As a result of the vibration plate 211 including a paramagnetic substance, as described in embodiment 4, even when a displacement in the Y direction occurs between a drive member 214 and the driven element 206, generation of a moment around the X axis by a magnetic force can be suppressed.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application Nos. 2010-109022, filed May 11, 2010, and 2010-148513, filed Jun. 30, 2010, which are hereby incorporated by reference herein in their entirety.

What is claimed is:

1. A vibration wave actuator comprising:
a vibrator including at least an electro-mechanical energy conversion element and an elastic body to which the electro-mechanical energy conversion element is joined, the elastic body including a contact portion formed therein;
a driven element that is in pressure contact with the contact portion of the vibrator and includes a magnetic substance;
a vibrator holding portion that holds the vibrator via a first elastic member having a stiffness lower than that of the vibrator; and
a magnet arranged on the vibrator holding portion such that the vibrator is placed between the driven element and the magnet.

2. The vibration wave actuator according to claim 1, wherein the vibrator holding portion is connected to a securing portion via a second elastic member having a stiffness lower than that of the first elastic member; and
wherein when the contact portion of the vibrator and the driven element are brought into pressure contact with each other, the second elastic member elastically deforms so that the vibrator holding portion follows the driven element.

3. The vibration wave actuator according to claim 1, wherein the elastic body in the vibrator includes a magnetic substance.

4. The vibration wave actuator according to claim 1, wherein the magnet is arranged between the vibrator holding portion and the vibrator on the vibrator side of the vibrator holding portion.

5. The vibration wave actuator according to claim 1, wherein the magnet is arranged on a surface on a side opposite to the vibrator side of the vibrator holding portion.

6. The vibration wave actuator according to claim 1, wherein the vibrator holding portion is formed integrally with the magnet.

7. The vibration wave actuator according to claim 1, comprising a plurality of the vibrators,
wherein the plurality of the vibrators are arranged at positions where directions of forces generated by elliptic motion of the contact portions are different, and moves the driven element that is in pressure contact with the vibrators via the contact portions of the vibrators in a predetermined movement direction formed by combining the forces in different directions.

8. A vibration wave actuator apparatus comprising:
a vibrator including an electro-mechanical energy conversion element and an elastic body to which the electro-mechanical energy conversion element is joined, the elastic body including a contact portion formed therein;
a driven element that is in pressure contact with the contact portion of the vibrator and includes a magnetic substance;
a yoke that is joined to a supporting portion of the vibrator and extends in a direction of a relative movement of the driven element and the vibrator; and
a magnet that is arranged on the yoke, such that the vibrator is placed between the driven element and the magnet.

9. The vibration wave actuator according to claim 8, wherein the contact portion formed on the elastic body in the vibrator includes a magnetic substance.

10. The vibration wave actuator to claim 8, wherein the supporting portion is formed at a position extending from a vibration portion of the elastic body in the direction of the relative movement and is joined to an end portion of the yoke extending in the direction of the relative movement.

11. The vibration wave actuator according to claim 8, wherein a joint portion joining the supporting portion and the yoke has a width smaller than a width of the driven element.

12. The vibration wave actuator according to claim 8, further comprising a second yoke extending in the direction of the relative movement on the magnet arranged on the yoke.

\* \* \* \* \*